United States Patent [19]

Fletchic et al.

[11] 4,082,292
[45] Apr. 4, 1978

[54] TONE ARM LIFT MECHANISM

[75] Inventors: Donald K. Fletchic, Arlington Heights; Howard J. Morrison, Deerfield, both of Ill.; Ralph H. Baer, Manchester, N.H.

[73] Assignee: Marvin Glass & Associates, Chicago, Ill.

[21] Appl. No.: 738,695

[22] Filed: Nov. 4, 1976

[51] Int. Cl.$^2$ ............................................ G11B 17/06
[52] U.S. Cl. ................................ 274/23 R; 274/15 R
[58] Field of Search ............ 274/1 R, 13 R, 14, 15 R, 274/23 R, 47

[56] References Cited
U.S. PATENT DOCUMENTS

| | | | |
|---|---|---|---|
| 2,031,074 | 2/1936 | Scheibell | 274/15 R |
| 2,192,360 | 3/1940 | Mann | 274/1 R |
| 2,952,464 | 9/1960 | Stimler | 274/23 R |
| 3,272,514 | 9/1966 | Heyerdahl | 274/23 R |
| 3,429,580 | 2/1969 | Hammond | 274/15 R |
| 3,563,554 | 2/1971 | Hess | 274/13 R |

Primary Examiner—Richard E. Aegerter
Assistant Examiner—John W. Shepperd
Attorney, Agent, or Firm—Mason, Kolehmainen, Rathburn & Wyss

[57] ABSTRACT

A tone arm lift mechanism for a programmable phonograph device includes a selectively actuatable solenoid mounted on the free end of the tone arm. The coil of the solenoid includes a movable armature and is mounted on the tone arm in a position so that the armature moves in a generally vertical direction, perpendicular to the surface of a record on the phonograph device. A resilient pad is provided on the lower end of the solenoid armature for engagement with the top surface of the record. A selectively actuatable control energizes the solenoid coil and moves the armature downwardly with respect to the coil, so that, as the resilient pad engages the record surface, the tone arm is moved upwardly so that the stylus moves out of engagement with the record grooves for transverse movement of the tone arm and stylus with respect to the record. In one embodiment, the armature includes a portion of permanently magnetized material which provides a controlled, linear response of the armature after enegization of the coil. A further embodiment provides a biasing leaf spring secured to the tone arm at one end and extending beneath the end of the solenoid armature. A resilient pad is mounted to the opposite side of the leaf spring so that the armature flexes the leaf spring downwardly moving the resilient pad into engagement with the record surface and lifting the tone arm off of the record.

35 Claims, 10 Drawing Figures

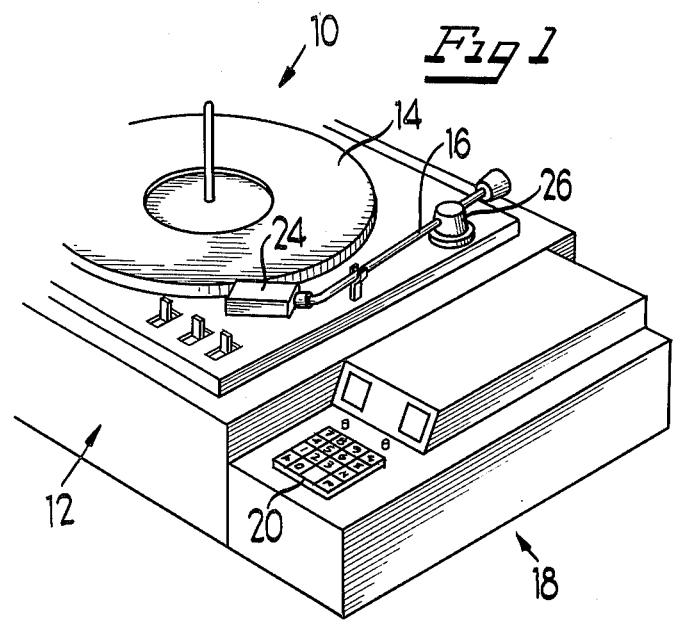
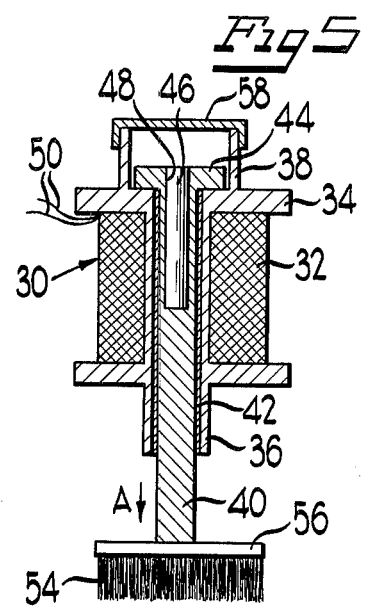
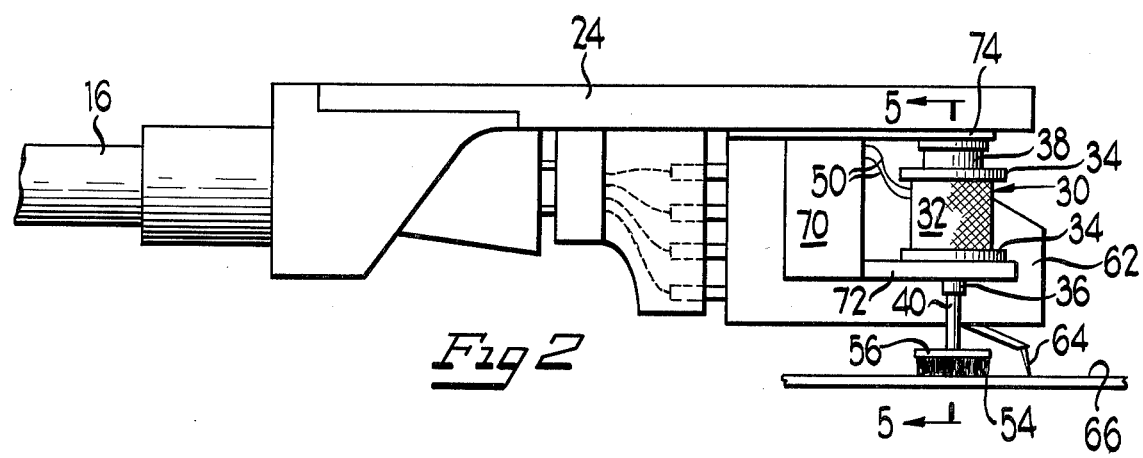
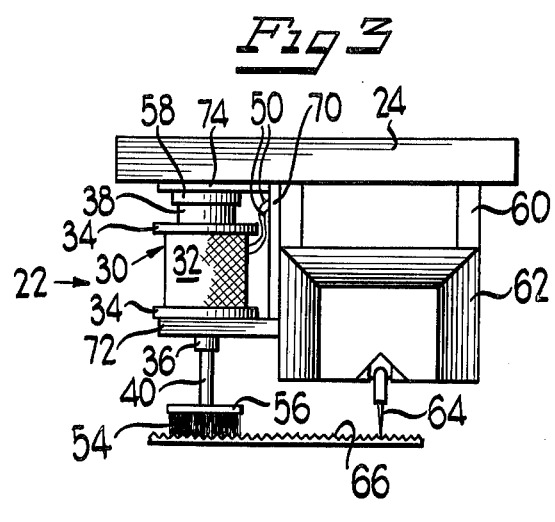
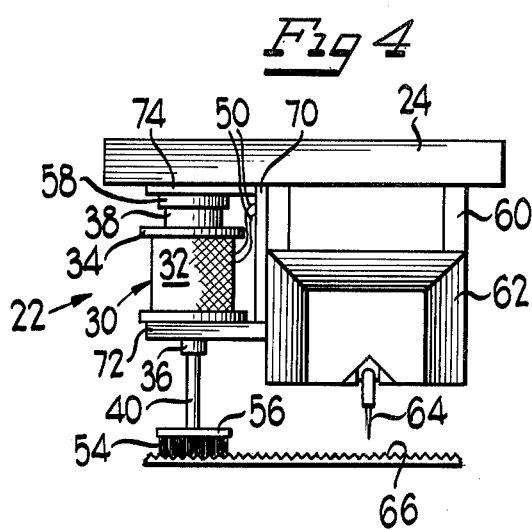

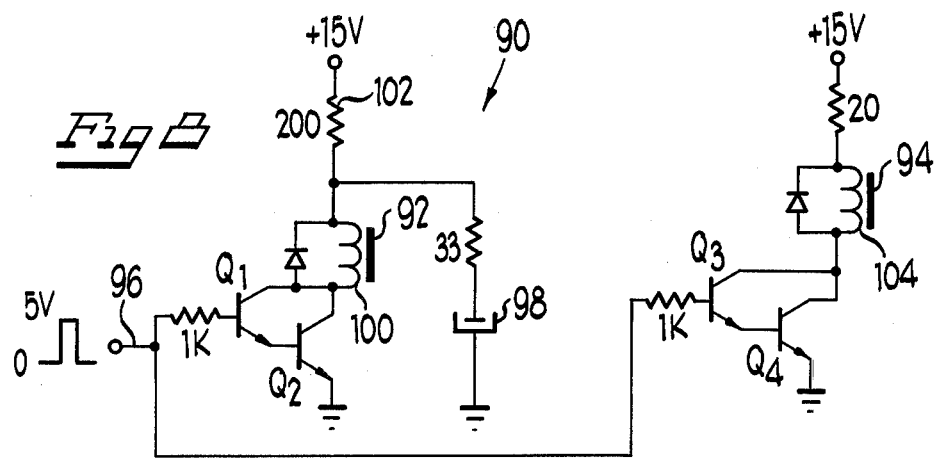
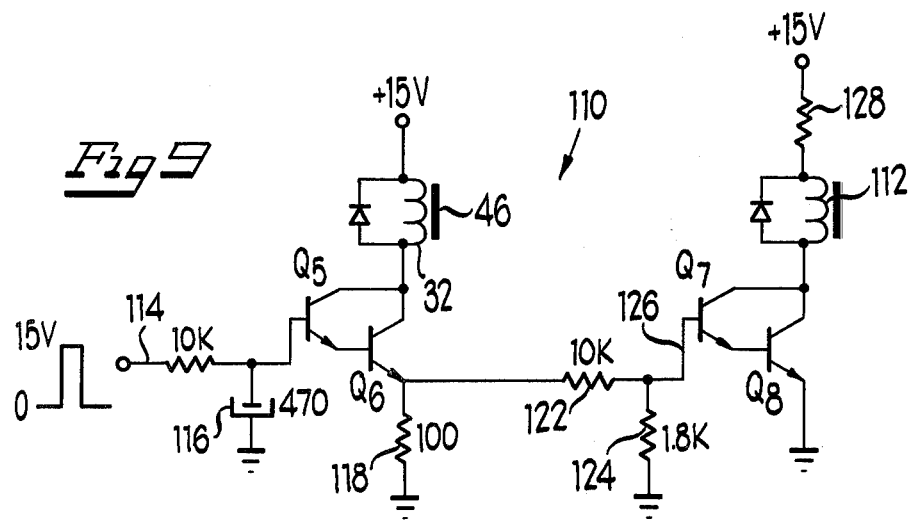
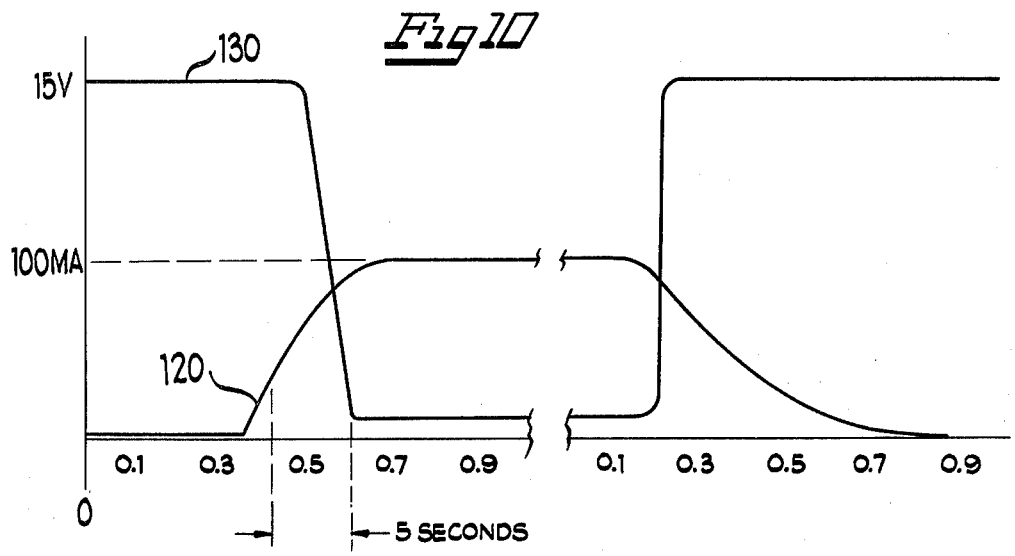

TONE ARM LIFT MECHANISM

BACKGROUND OF THE INVENTION

1. Field of the Invention

The present invention relates to an improvement in phonograph tone arm lift mechanisms suitable for use on programmable phonograph record players such as that shown and described in copending U.S. Patent Application Ser. No. 682,079 filed Apr. 30, 1976, assigned to the assignee of the present invention. In particular, the invention relates to improvements in tone arm lift mechanisms of programmable record changers.

2. Brief Description of the Prior Art

Various prior art phonograph devices have been proposed which are designed to permit a user to select a certain number of sound tracks to be played from a particular record while skipping certain other sound tracks. Several of these proposals have been described in the above copending application. In programmable phonograph devices, it is necessary to mount some type of sensor assembly, usually on the tone arm adjacent the stylus, to detect the presence of an approaching land area between modulated or recorded grooved sound track portions on a record. In order to provide accurate and reliable sensor readings, it is desirable that the sensor be held at a substantially constant, predetermined elevated position above the record surface, particularly during the traversing mode as the tone arm and sensor are searching for the next sound track portion to be played.

SUMMARY OF THE INVENTION

An object of the present invention is to provide an improved tone arm lift mechanism for use on programmable phonograph devices.

Another object of the present invention is to provide an improved tone arm lift mechanism adapted and suited for use on a record changer which will enable the sensor to scan at a predetermined height above the record surface regardless of the number of records stacked on the turntable by the changer mechanism.

In accordance with the above and other objects, the present invention provides a tone arm lift mechanism for a programmable phonograph device, including a selectively actuatable linear motor mounted on the free end of the tone arm. The motor includes a movable armature and is mounted on the tone arm in a position so that the armature moves in a generally vertical direction, perpendicular to the surface of a record on the phonograph device. A resilient pad is provided on the lower end of the motor armature for engagement with the surface of the record. A selectively actuatable control energizes the motor coil and moves the armature downwardly with respect to the coil, so that, as the resilient pad engages the record surface, the tone arm is moved upwardly so that the stylus moves out of engagement with the record grooves for transverse movement with respect to the record. The armature includes a portion of permanently magnetized material which in combination with a novel circuit provides a linear, controlled response of the armature after energization of the coil. A further embodiment provides a biasing leaf spring secured to the tone arm at one end and extending beneath the end of the motor armature. A resilient pad is mounted to the underside of the leaf spring so that the armature flexes the leaf spring downwardly moving the resilient pad into engagement with the record surface and thereby lifting the tone arm off of the record.

Other objects, features and advantages of the invention will be apparent from the following detailed description taken in connection with the accompanying drawings.

BRIEF DESCRIPTION OF THE DRAWINGS

FIG. 1 is a partially fragmented front perspective view of a programmable record changer made in accordance with the concepts of the present invention;

FIG. 2 is a side elevational view, on an enlarged scale, of the free end of the tone arm;

FIG. 3 is an end elevational view of the tone arm of FIG. 2, showing the stylus in its down position;

FIG. 4 is an end elevational view similar to FIG. 3, showing the stylus in its up position;

FIG. 5 is a generally vertical section, on an enlarged scale, taken generally along line 5—5 of FIG. 2;

FIG. 8 is an electrical schematic view of the tone arm list and tone arm traverse solenoids;

FIG. 9 is another electrical schematic view showing an interlocked circuit for actuating the tone arm lift and tone arm traverse solenoids; and FIG. 10 is a graph showing the operation of the interlocked circuit of FIG. 9.

DESCRIPTION OF THE PREFERRED EMBODIMENT

Figure 6:
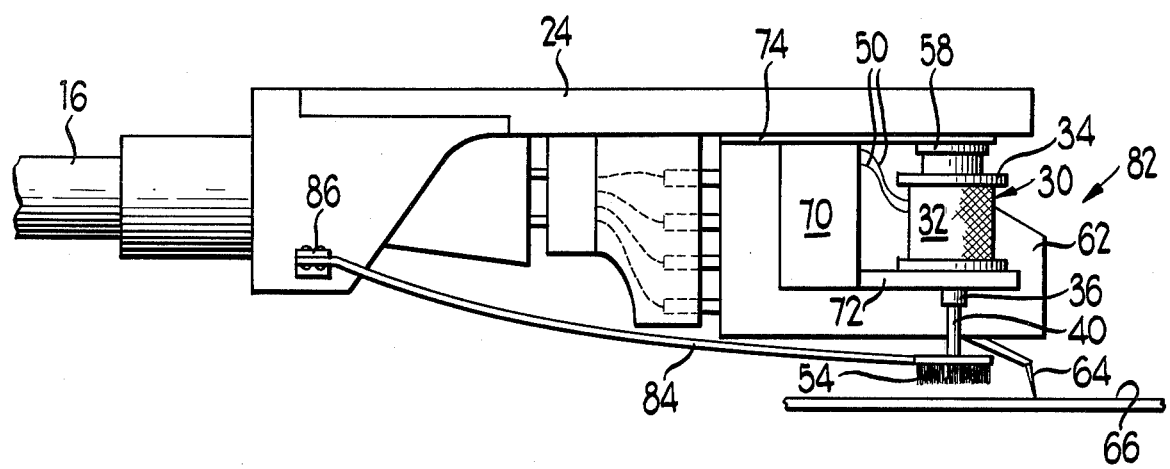
FIG. 6 is another side elevational view, on an enlarged scale, similar to FIG. 2, showing an alternate embodiment of the tone arm lift mechanism with the stylus in its down position.
Figure 7:
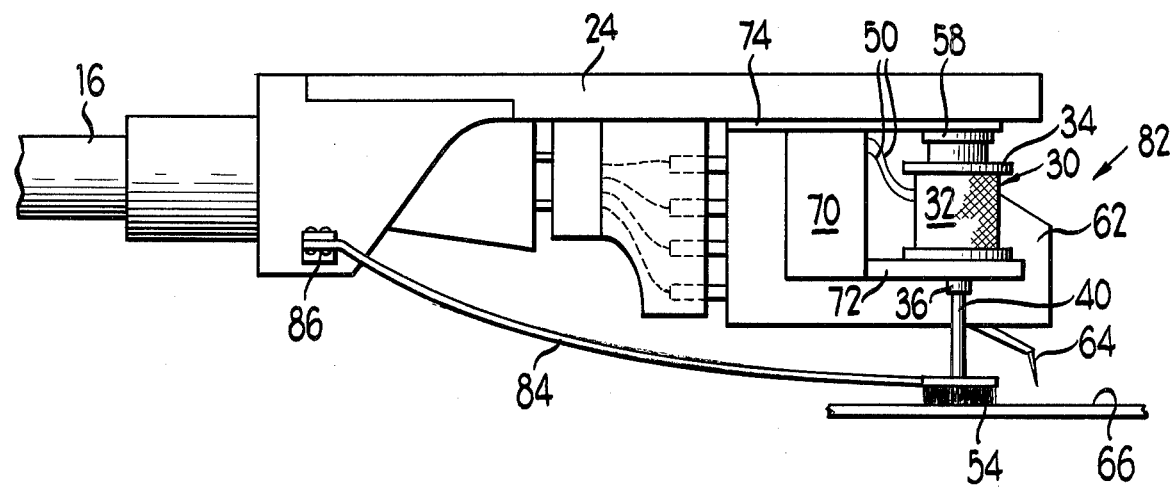
FIG. 7 is a side elevational view similar to FIG. 5, showing the stylus in its up position.

A record changer, generally designated 10, incorporating the concepts of the present invention, is shown in FIG. 1 to include a conventional record changer 12 having a turntable 14 and tone arm 16. The record changer 10 includes a programmable control system, generally designated 18, which includes a keyboard 20 for entering data. The programmable control system 18 permits a user to select a predetermined number of sound track portions to be played while skipping other sound track portions which the user is not desirous of hearing. For example, the record changer can be programmed to play record bands two, five and six from record one, bands, one, three, four and seven from record two, and so on for all of the records which can be stacked on the record changer. Mechanical and electronic elements utilized to accomplish this programmable operation are shown in copending patent applications Ser. No. 682,079 filed Apr. 30, 1976, Ser. No. 705,137 filed July 14, 1976 and Ser. No. 705,138 filed July 14, 1976, all of which are assigned to the assignee of the present invention. These applications are incorporated herein by reference. The present invention relates particularly to a novel tone arm lift mechanism, generally designated 22 (FIG. 2), which is used to lift the tone arm and stylus vertically off of the record for horizontal pivotal tone arm movement to the next preprogrammed sound track band to be played.

More particularly, referring to FIG. 2, the tone arm 16 includes a head assembly 24 at the free end of the tone arm, opposite the end secured to a pivot 26. The tone arm lift mechanism 22 comprises a solenoid in the form of a linear motor 30 shown in cross section in FIG. 5. The linear motor 30 includes a winding or coil 32 wrapped about a supporting spool 34. The spool 34 preferably is made of lightweight plastic material having a lower, generally vertical armature guide sleeve portion 36 and a similar, larger, upper armature guide sleeve portion 38. A vertically reciprocating armature 40 is mounted generally axially within the spool 34 by a brass or bronze tubular bushing 42 which facilitates vertical reciprocal movement of the armature 40. The armature 40 is preferably made of a similar lightweight plastic material and includes an upper, top end flange 44 which acts as a stop means to limit the downward travel of the armature 40 with respect to the coil 32 and spool 34. A permanently magnetized rod 46 is press fit within a cylindrical opening 48 at the top of the armature 40 to provide movement of the armature. Particularly, as the coil 32 is energized through its leads 50, either manually or automatically, as described in the above-referenced applications, an electric field is generated which draws the permanent magnet portion 46 of the armature downwardly within the coil, thus driving the armature downwardly in the direction of arrow A (FIG. 5).

Resilient means 54, such as a pad of Velcro or a similar material, is mounted by a horizontal plate 56 to the bottom end of the armature 40 for engagement with a record surface. A top cap 58 closes the top end of the upper armature guide portion 38.

Referring to FIGS. 2, 3 and 4, the tone arm head 34 includes a cartridge mounting harness 60 for removably mounting a suitable cartridge 62. The cartridge 62 includes a phonograph stylus 64 for tracking the surface of a record 66 shown in FIGS. 2, 3 and 4. In any programmable phonograph device, a sensor such as an electro-optic sensor is mounted on the end of the tone arm to identify the various land areas between modulated sound track portions, but for simplicity in this application, the electro-optic sensor has not been shown on the drawings. The sensor assembly is shown in the above incorporated patent applications and need not be discussed in detail herein. Additionally, the phonograph cartridge 62 may include a sensor as an integral part of the cartridge itself. Such a cartridge is shown in patent application Ser. No. 710,024 filed July 30, 1976 and assigned to the assignee of the present invention.

The linear motor 30 is mounted to the tone arm head 24 by a bracket 70 adjacent the cartridge harness 60 as shown in FIG. 3. The bracket 70 includes a bottom horizontal flange 72 for securement to the spool 34 and a top horizontal flange 74 for securement to the cap 58. FIGS. 3 and 4 show the two positions of the tone arm lift mechanism 22. Since the armature 40 of the linear motor 30 is not biased upwardly in the stylus "down" position, as shown in FIG. 3, the stylus is in engagement with a groove of the record surface 66 and the resilient pad 54 is resting on the record surface supporting its own weight and that of the armature 40. In this position, the armature is moved upwardly within the coil by the weight of the tone arm, but the top flange 44 does not engage the cap 58 and therefore no pressure from the weight of the tone arm is applied to the resilient pad 54.

Referring to FIG. 4, when the coil 32 is energized, the armature 40 is drawn downwwardly with respect to the coil and moves to the position as shown in FIG. 5 so that the flange 44 engages the top of the spool 34 to provide a definite limit to the travel of the armature 40. When energized by the circuit shown in FIG. 9, the pad 54 applies an increasing force to the record surface to gently or linearly lift the tone arm 24 and thus the stylus 64 out of engagement with the record surface which then permits the tone arm to be driven across the record surface in search of the next sound track selection to be played. Therefore, FIG. 4 represents the stylus "up" position. As soon as the coil is de-energized, the weight of the tone arm cushioned to slowly move the stylus 64 back into engagement with the record surface, thus, in effect, moving the armature 40 back upwardly into the coil to the position as shown in FIG. 3, previously described.

The linear motor 30 provides particular advantages in that its response can be regulated by adjusting the current through the coil 32. The coil 32 can be energized or de-energized by a varying rate, increasing or decreasing, of current to provide further control of the movement of the tone arm between its respective positions. It is desirable to lift the tone arm smoothly without permitting the pad 54 to "jump" from the record surface when moving the tone arm to the "up" position, and similarly, it is desirable to lower the tone arm smoothly so as not to damage the record surface as the stylus 64 engages a groove thereon. The circuit which provides this varying drive current is shown in FIG. 9, and described below. The stop means or flange 44 limits the downward movement of the solenoid armature 40 to a predetermined point so that the sensor assembly will scan the record surface from a constant, predetermined height whenever the tone arm is in the stylus "up" position. Additionally, the present tone arm lift mechanism 22 will maintain the stylus and more importantly the sensor at a constant height above the record surface regardless of the number of records stacked on the turntable. The circuit of FIG. 9 provides a substantially complete lift of the tone arm before the tone arm is pivoted inwardly.

An alternate embodiment of the tone arm lift mechanism 82 is shown in FIGS. 5 and 6. In this embodiment, all of the elements including the tone arm 16, tone arm head 24 and linear motor 30 are the same as previously described. However, a leaf spring 84 is provided to bias the solenoid armature 40 upwardly. More particularly, referring to FIGS. 5 and 6, the leaf spring 84 is secured by a bracket 86 to the head assembly 24 and extends generally horizontally to pass below the armature 40. In this embodiment, the resilient pad 54 is secured to the underside of the leaf spring contacted by the armature 40. The leaf spring 84 biases the armature 40 upwardly so that the flange 44 engages the inside of the cap 58 which supports the pad 54 out of engagement with the record surface. This alternate embodiment 82 thus reduces the drag caused by the resilient pad 54 on the record surface 66 when in the stylus "down" position. FIG. 5 shows the tone arm in the stylus "down" position while FIG. 6 shows the tone arm in the stylus "up" position. Referring to FIG. 6, when the coil 32 is energized, the armature 40 moves downwardly, thus flexing the leaf spring 84 and moving the resilient pad 54 into engagement with the record surface to lift the tone arm and stylus 64 out of engagement with the record surface 66. After the coil is subsequently de-energized, the resilient pad 54 is lifted by the leaf spring 84 out of engagement with the record surface, back to the position as shown in FIG. 5 to bring the stylus into a record groove.

The cartridge harness 60 includes a plurality of suitable connector pins for connecting the cartridge to the audio amplifier, and in the case of a cartridge including a sensor, appropriate connector pins for connecting the sensor to the control system 18 of the programmable phonograph device. The leads 50 of the coil 42 also are connected to the control system 18 in a similar manner.

The linear motor 30 as described previously, provides a controlled, linear lifting motion of the tone arm 16 to smoothly lift the stylus 64 out of the record groove. FIG. 8 shows a circuit, generally designated 90, utilized to actuate a tone arm lift solenoid 92 and a tone arm traverse clutch solenoid 94 as disclosed in U.S. patent application Ser. No. 682,079 which has been incorporated herein by reference. The incoming logic signal on line 96 saturates the Darlington connected transistors Q1 and Q2 which discharges the previously fully charged capacitor 98 through the solenoid coil 100 thus rapidly lifting the tone arm 16 and stylus 64 off of the record surface. The 15 volt supply then maintains the solenoid in an energized state through resistor 102 until the logic level signal on line 96 terminates to turn off Q1 and Q2. The same logic signal on line 96 is applied to a similar pair of Darlington connected transistors Q3 and Q4 which, upon saturation, energize the coil 104 of the tone arm traverse clutch solenoid 94 until the logic level signal is terminated. Thus, the tone arm lift solenoid 92 is rapidly energized while, at the same time, the tone arm traverse clutch solenoid 94 also is energized. And, in a similar manner, both solenoids are de-energized upon the termination of the input on line 96.

The circuit, generally designated 110, shown in FIG. 9, provides an interlock between the tone arm traverse clutch solenoid 112 and the linear motor coil 32 to permit the stylus 64 to be substantially raised to its uppermost limit before the tone arm traverse solenoid 112 is energized to cause the tone arm 16 to sweep across the record surface. Additionally, as described previously, the circuit 110 provides a gentle increasing current or ramp supply to the linear motor coil 32 to gently lift the tone arm stylus out of the record groove. This particular advantage of the linear motor 30 prevents the pad 54 from "jumping" off of the record surface when moving the tone arm 16 to the up position and similarly, provides a smooth, linear lowering of the stylus 64 into engagement with the record surface so as to prevent any damage thereto. Referring again to FIG. 9, the logic signal on line 114 is connected to the base of a transistor Q5 and a 470 microfarid capacitor 116. As the signal is received, the capacitor 116 provides a ramping function so that the base of Q5 is biased by an increasing signal. Transistor Q5 is connected in a Darlington arrangement with a second transistor Q6 between one terminal of the linear motor coil 32 and ground through a 100 ohm resistor 118. The other end of the linear motor coil 32 is connected to a 15 volt supply. Therefore, as the input signal on line 114 steps to the logic level (15 v.), the amount of current passing through the coil 32 slowly increases because of the ramping effect of the capacitor 116. This provides a "ramp function" of increasing current for moving the magnetic armature 46 of the linear motor which increases from approximately a 0 level to approximately 100 milliamps. Referring to the graph in FIG. 10, the bottom curve 120 represents the increasing current supply to the coil 32 from approximately 0 to 100 milliamps in approximately 0.2 seconds. It is clear that the time interval for reaching the maximum current through the coil 32 can be easily adjusted by varying the resistance of the 10K resistor. Thus, the rising current applied to the coil 32 of the linear motor 30 provides a controlled, linear lift of the stylus and tone arm 16.

Referring again to FIG. 9, the emitter of transistor Q6 is also connected through a 10K resistor 122 to the base of a transistor Q7 and through a 1.8K resistor 124 to ground. Thus, as the current through transistor Q6 increases, the circuit provides an increasing bias on line 126 to the base of transistor Q7 which is connected in a Darlington arrangement with transistor Q8 having its collector and emitter connected between ground and one terminal of the tone arm traverse clutch solenoid 112. The other end of the solenoid coil 112 is connected to a resistor 128 through a 15 volt power supply.

The resistors 118 and 124 provide a delay before actuation of the traverse clutch solenoid 112 since the bias to the base of Q7 must reach approximately 1.2 volts before Q8 will conduct.

Referring again to the graph of FIG. 10, the upper line 130 represents the voltage at the collector of Q8 which is shown to be 15 volts during the initial period of the increasing current to the linear motor solenoid 32. After the current to the linear motor coil 32 reaches approximately 80 milliamps so that the tone arm is raised approximately 80 percent of its lift, the base of Q7 is sufficiently biased and Q8 saturates thus rapidly dropping the voltage at the collector and thus providing full current to the tone arm traverse clutch solenoid 112. Thus the circuit 110 provides a controlled linear lift of the tone arm while preventing actuation of the tone arm traverse clutch solenoid 112 until the tone arm is approximately to its upper limit of travel. An inverse sequence occurs immediately after the logic signal is terminated which causes the tone arm traverse clutch solenoid 112 to de-energize and thus drop out the tone arm traverse clutch, as soon as the tone arm lift solenoid begins to lower the stylus 64 toward the record surface. Thus, the tone arm comes to a complete stop in the horizontal plane before the tone arm and stylus are lowered into engagement with the record surface in a controlled, linear motion as shown at the righthand end of the graph of FIG. 10.

It can be seen from this disclosure that the linear motor could be mounted at any angle, such as shown in application Ser. No. 682,079 at 90°, with respect to the record surface without departing from the concepts of the present invention.

The foregoing detailed description has been given for clearness of understanding only and no unnecessary limitations should be understood therefrom as some modifications will be obvious to those skilled in the art.

I claim:

1. A tone arm lift mechanism for a phonograph device having a turntable for supporting a record and a tone arm mounted for movement of one end over the record surface, comprising:
   a selectively actuatable solenoid coil mounted on the tone arm including a solenoid armature movable with respect to the coil and oriented in position for movement generally perpendicular to the surface of a record disposed on the phonograph device;
   resilient means mounted adjacent one end of said armature for engagement with the surface of said record; and
   means for energizing said solenoid coil to move the resilient means into engagement with said record and lift the tone arm with respect to the record surface.

2. The tone arm lift mechanism of claim 1 wherein said tone arm includes a stylus for engagement with the grooves of a record and means mounting said tone arm for movement between a down position with the stylus in engagement with the record groove and an up position with the stylus out of engagement with the record grooves.

3. The tone arm lift mechanism of claim 2 including stop means associated with the armature for providing a limit of travel for moving the stylus to a predetermined distance above the record surface when in said up position.

4. The tone arm lift mechanism of claim 2 including biasing means in engagement with said armature for biasing the armature upwardly to support the resilient means out of engagement with the record surface when in said stylus down position.

5. The tone arm lift mechanism of claim 1 wherein at least a portion of said solenoid armature comprises permanently magnetized material.

6. The tone arm lift mechanism of claim 1 wherein said means for energizing the solenoid coil includes circuit means providing an increasing current to the coil when energized to provide a controlled, linear lift to the tone arm.

7. In a phonograph device having a turntable and a movably mounted tone arm, a tone arm lift mechanism, comprising:
a selectively actuatable linear motor mounted on the tone arm, said linear motor including a coil and a generally axially mounted magnetized armature oriented in a position for movement generally perpendicular to the surface of a record on the turntable;
resilient means mounted adjacent one end of said armature for engagement with the surface of a record; and
means for selectively energizing said linear motor to move the armature with respect to said coil and thereby move the tone arm upwardly with respect to the record surface.

8. The tone arm lift mechanism of claim 7 wherein said tone arm includes a stylus for engagement with the grooves of a record and means mounting said tone arm for movement between a down position with the stylus in engagement with the record groove and an up position with the stylus out of engagement with the record grooves.

9. The tone arm lift mechanism of claim 8 including stop means associated with the armature for providing a limit of travel for moving the stylus to a predetermined distance above the record surface when in said up position.

10. The tone arm lift mechanism of claim 8 including biasing means in engagement with said armature for biasing the armature upwardly to support the resilient means out of engagement with the record surface when in said stylus down position.

11. The tone arm lift mechanism of claim 7 wherein said means for energizing the linear motor includes circuit means providing an increasing current to the linear motor coil when energized to provide a controlled linear lift of the tone arm.

12. A tone arm lift mechanism for a phonograph device, comprising:
a tone arm including a stylus for engagement with the grooves of a record on the phonograph device; means mounting, said tone arm for movement between a down position whereat the stylus is in engagement with a record groove and an up position whereat the stylus is out of engagement with a record groove;
a selectively actuatable linear motor mounted on the free end of the tone arm, in a position generally adjacent the stylus, said linear motor comprising an electrical coil and an armature slidably mounted generally axially within the coil for movement with respect thereto, said coil and armature being oriented in a position so that the axis thereof is generally perpendicular to the surface of a record on the phonograph device;
resilient means mounted adjacent one end of said armature for engagement with the record surface; and
means for energizing said linear motor to move the armature downwardly with respect to said coil to thereby move the tone arm from the down position to the up position.

13. The tone arm lift mechanism of claim 12 wherein said motor includes stop means for providing a limit of travel of the armature to move the stylus to a predetermined distance above the record surface when in said up position.

14. The tone arm lift mechanism of claim 12 wherein at least a portion of said solenoid armature comprises permanently magnetized material.

15. The tone arm lift mechanism of claim 12 including biasing means in engagement with said armature for biasing the armature upwardly to support the resilient means out of engagement with the record surface when in said stylus down position.

16. The tone arm lift mechanism of claim 12 wherein said means for energizing the linear motor includes circuit means providing an increasing current to the linear motor coil when energized to provide a controlled linear lift of the tone arm.

17. The tone arm lift mechanism of claim 12 including a tone arm traverse mechanism having selectively actuable drive means for moving the tone arm transversely with respect to the record surface.

18. The tone arm lift mechanism of claim 17 wherein said circuit means includes a traverse interlock to permit traverse movement of said tone arm only after said linear motor has moved the tone arm substantially to its up position.

19. A tone arm lift mechanism for a phonograph device, comprising:
a tone arm including a stylus for engagement with the grooves of a record, means mounting said tone arm for movement between a down position whereat the stylus is in engagement with a record groove and an up position whereat the stylus is out of engagement with the record grooves;
a selectively actuatable solenoid coil mounted on the free end of the tone arm including a solenoid armature movable with respect to the coil, said coil and armature being oriented in a position for movement of the armature generally perpendicular to the surface of a record on the phonograph device;
a generally horizontally extending biasing means connected at one end to the tone arm and having the opposite and extending generally below the solenoid armature;
resilient means mounted on the biasing means for engagement with the record surface; and
means for energizing said solenoid coil to move the armature and biasing means downwardly with respect to said coil to move the resilient means into engagement with the record surface to thereby move the tone arm between its down position and its up position.

20. The tone arm lift mechanism of claim 19 wherein said biasing means comprises a resilient leaf spring.

21. The tone arm lift mechanism of claim 19 including stop means associated with the armature for providing a limit of travel to the armature for the stylus to a predetermined distance above the record surface when in said up position.

22. The tone arm lift mechanism of claim 21 wherein at least a portion of said solenoid armature comprises permanently magnetized material.

23. The tone arm lift mechanism of claim 22 wherein said means for energizing the coil includes circuit means providing an increasing current to the coil when energized to provide a controlled linear lift of the tone arm.

24. The tone arm lift mechanism of claim 23 including a tone arm traverse mechanism having selectively actuable drive means for moving the tone arm transversely with respect to the record surface.

25. The tone arm lift mechanism of claim 24 wherein said circuit means includes a traverse interlock to permit traverse movement of said tone arm only after said solenoid has moved the tone arm substantially to its up position.

26. A tone arm lift mechanism for a phonograph device, comprising:
a tone arm;
means mounting said tone arm for movement about one end;
a stylus mounted on the opposite end of the tone arm for engagement with a record on the phonograph device;
a selectively actuatable solenoid mounted on the tone arm, said solenoid including an armature movable with respect to the tone arm and oriented in a position for movement into engagement with the surface of the record; and
means for energizing said solenoid to lift the tone arm with respect to the record surface.

27. The tone arm lift mechanism of claim 26 including stop means associated with the solenoid armature to provide a limit of travel of the armature with respect to the tone arm to move the stylus to a predetermined distance above the record surface.

28. The tone arm lift mechanism of claim 26 including biasing means in engagement with said armature for biasing the armature upwardly to support the armature out of engagement with the record surface when the stylus is in engagement with the record.

29. The tone arm lift mechanism of claim 26 wherein at least a portion of said solenoid armature comprises permanently magnetized material.

30. The tone arm lift mechanism of claim 29 wherein said means for energizing said solenoid includes circuit means having a traverse interlock to permit traverse movement of said tone arm only after said solenoid has moved the tone arm substantially upwardly with respect to the record surface.

31. The tone arm lift mechanism of claim 26 including a tone arm traverse means having a selectively actuatable drive means for moving the tone arm transversely with respect to the record surface.

32. The tone arm lift mechanism of claim 26 wherein said means for energizing the solenoid coil includes circuit means providing an increasing current to the coil when energized to provide a controlled, linear lift to the tone arm.

33. In a phonograph device, a tone arm lift mechanism, comprising:
a tone arm;
means mounting said tone arm for pivotal movement about one end thereof;
a stylus mounted on the opposite end of the tone arm for engagement with the grooves of a phonograph record on the phonograph device;
a selectively actuatable linear motor mounted on the tone arm, said linear motor including a coil and a generally axially mounted magnetized armature oriented in a position for movement generally perpendicular to the surface of said record; and
means for selectively energizing said linear motor to lift the tone arm with respect to the record surface.

34. The tone arm lift mechanism of claim 33 including biasing means associated with said armature for biasing the armature upwardly to support the armature out of engagement with the record surface when the stylus is in engagement with the record.

35. The tone arm lift mechanism of claim 34 wherein said means for energizing the linear motor includes circuit means providing an increasing current to the linear motor when energized to provide a controlled linear lift to the tone arm.

* * * * *